(12) United States Patent
Husnik et al.

(10) Patent No.: US 11,604,093 B2
(45) Date of Patent: Mar. 14, 2023

(54) SPECTROMETER DEVICE AND METHOD FOR PRODUCING A SPECTROMETER DEVICE

(71) Applicant: Robert Bosch GmbH, Stuttgart (DE)

(72) Inventors: Martin Husnik, Stuttgart (DE);
Christian Huber, Ludwigsburg (DE);
Reinhold Roedel, Reutlingen (DE);
Benedikt Stein, Stuttgart (DE);
Christoph Schelling, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 54 days.

(21) Appl. No.: 17/262,892

(22) PCT Filed: Jul. 9, 2019

(86) PCT No.: PCT/EP2019/068347
§ 371 (c)(1),
(2) Date: Jan. 25, 2021

(87) PCT Pub. No.: WO2020/025263
PCT Pub. Date: Feb. 6, 2020

(65) Prior Publication Data
US 2021/0164836 A1 Jun. 3, 2021

(30) Foreign Application Priority Data
Jul. 31, 2018 (DE) ...................... 10 2018 212 755.7

(51) Int. Cl.
*G01J 3/26* (2006.01)
*G01J 3/02* (2006.01)
*G01J 3/28* (2006.01)

(52) U.S. Cl.
CPC ................. *G01J 3/26* (2013.01); *G01J 3/021* (2013.01); *G01J 3/2803* (2013.01)

(58) Field of Classification Search
CPC ........ G01J 3/021; G01J 3/26; G02B 6/29395; G02B 6/29358; G02B 26/001
See application file for complete search history.

(56) References Cited

U.S. PATENT DOCUMENTS

| 7,286,244 B2 | 10/2007 | Murata |
| 2002/0181126 A1* | 12/2002 | Nishioka ............... G02F 1/1334 359/726 |

(Continued)

FOREIGN PATENT DOCUMENTS

DE 10 2016 212 088 A1 1/2018

OTHER PUBLICATIONS

International Search Report corresponding to PCT Application No. PCT/EP2019/068347, dated Dec. 17, 2019 (German and English language document) (8 pages).

(Continued)

*Primary Examiner* — Michael A Lyons
(74) *Attorney, Agent, or Firm* — Maginot, Moore & Beck LLP (57) ABSTRACT

A spectrometer device includes a Fabry-Perot interferometer unit, which comprises a first carrier substrate, wherein the first carrier substrate is arranged on a lower side of the Fabry-Perot interferometer unit and includes an optical aperture. The spectrometer includes at least one of a first substrate, which is arranged on an upper side of the Fabry-Perot interferometer unit, which faces away from the lower side, and a second substrate with the first carrier substrate arranged with the lower side on the second substrate. The spectrometer further includes a photodetector device arranged on or in the at least one of the second substrate and the first substrate. A first electrical connection region of the photodetector device and a second electrical connection (Continued)

region of the Fabry-Perot interferometer unit are electrically contacted from the same direction.

20 Claims, 5 Drawing Sheets (56) References Cited

U.S. PATENT DOCUMENTS

| | | | |
|---|---|---|---|
| 2003/0173499 A1 | 9/2003 | Cole et al. | |
| 2003/0173504 A1* | 9/2003 | Cole | G01J 3/36 257/E31.115 |
| 2004/0217264 A1* | 11/2004 | Wood | G01J 3/26 250/214 R |
| 2005/0111008 A1* | 5/2005 | Murata | G02B 26/001 356/519 |
| 2006/0118721 A1* | 6/2006 | Antoszewski | H01L 31/1032 250/338.4 |
| 2016/0245696 A1 | 8/2016 | Shibayama et al. | |
| 2016/0245697 A1* | 8/2016 | Shibayama | G01J 3/26 |
| 2020/0103721 A1* | 4/2020 | Matsuno | G01J 3/26 |
| 2021/0389178 A1* | 12/2021 | Tabata | G01J 3/0291 |
| 2021/0396579 A1* | 12/2021 | Oyama | G01J 3/26 |

OTHER PUBLICATIONS

Antila, J., "Miniaturized Spectrometer Technologies," In proceedings of 9th Euro-American Workshop on Information Optics, Jul. 2010 (4 pages).

* cited by examiner

SPECTROMETER DEVICE AND METHOD FOR PRODUCING A SPECTROMETER DEVICE

This application is a 35 U.S.C. § 371 National Stage Application of PCT/EP2019/068347, filed on Jul. 9, 2019, which claims the benefit of priority to Serial No. DE 10 2018 212 755.7, filed on Jul. 31, 2018 in Germany, the disclosures of which are incorporated herein by reference in their entirety.

The present disclosure relates to a spectrometer device and a method for producing a spectrometer device.

BACKGROUND

To produce the most cost-effective and small-scale possible spectrometers, which are nonetheless high-performance, the requirement usually exists of managing with the fewest possible components and the most minimal possible number of production steps executable easily and cost-effectively and achieving the smallest possible structural size. However, either many method steps or components are usually required for producing spectrometer devices, which can also result in large structural volumes and can increase the occurring costs for components and the production.

A detector setup having a Fabry-Perot interferometer as part of a miniaturized spectrometer is specified in U.S. Pat. No. 7,286,244. Such an embodiment of a spectrometer is also known from the documents US 2016/245696 and US 2016/245697.

SUMMARY

The present disclosure provides a spectrometer device as disclosed herein and a method for producing a spectrometer device.

The present invention provides a spectrometer device as claimed in claim 1 and a method for producing a spectrometer device as claimed in claim 15.

Preferred refinements are the subject matter of the disclosure.

The underlying concept of the present disclosure is to specify a spectrometer device which is distinguished by a small structural size and a cost-effective way of producing an assembly (package) and/or a detector arrangement having a Fabry-Perot interferometer. The most cost-effective but nonetheless high-performance spectrometer device having the smallest possible structural size is advantageously provided here, wherein the number of the component parts used is advantageously kept as small as possible and advantageously only the most minimal possible number of production steps, which are advantageously simple and cost-effective to carry out, can be applied during the production.

According to the disclosure, the spectrometer device comprises a Fabry-Perot interferometer unit, which comprises a first carrier substrate, wherein the first carrier substrate is arranged on a lower side of the Fabry-Perot interferometer unit and includes an optical aperture; a first substrate, which is arranged on an upper side of the Fabry-Perot interferometer unit, which faces away from the lower side, and/or a second substrate, wherein the first carrier substrate is arranged having the lower side on the second substrate; a photodetector device, which is arranged on or in the second substrate and/or on or in the first substrate, wherein a first electrical connection region of the photodetector device and a second electrical connection region of the Fabry-Perot interferometer unit can be electrically contacted from the same direction.

According to one preferred embodiment of the spectrometer device, the first substrate comprises a cap substrate, using which the Fabry-Perot interferometer unit can be covered, and the second substrate comprises a base substrate, on which the Fabry-Perot interferometer unit can be attached.

According to one preferred embodiment of the spectrometer device, the optical aperture is formed by an opening in the first carrier substrate or a nontransparent coating on the first carrier substrate.

A nontransparent coating can also be arranged in the region of the aperture on the first and/or second substrate.

According to one preferred embodiment of the spectrometer device, the spectrometer device comprises a reflector device, which is arranged downstream of the photodetector device in a light incidence direction, so that the photodetector device is arranged between the reflector device and the Fabry-Perot interferometer unit.

The photodetector device can advantageously comprise one or more detectors for light detection, which can be arranged at one point or spatially separated at multiple points in the spectrometer device.

The cap substrate can advantageously be arranged by means of a bond connection on the Fabry-Perot interferometer unit, wherein for example a bond frame can be used, which can be arranged or formed on the Fabry-Perot interferometer unit and on which the cap substrate can be placed. In a similar way, the Fabry-Perot interferometer unit can be arranged via a further bond frame on the base substrate.

The base substrate and/or the cap substrate can advantageously comprise electrical conductor tracks and connection regions, for example bond pads (wire connection regions), on a side on which the photodetector device can be arranged. Both the base substrate and also the cap substrate are transmissive for the incident light to be detected in the wavelength range to be analyzed outside a region of a photodetector device. The base substrate and/or the cap substrate can advantageously consist, for example, of silicon, glass, or sapphire.

The photodetector device can advantageously be connected by means of a bond connection (for example direct bond connection) and/or an adhesive bond to the Fabry-Perot interferometer unit or arranged thereon.

The bond connection can advantageously be made transmissive for the light. In these terms, adhesive bonds between the base substrate and the Fabry-Perot interferometer unit and/or between the cap substrate and the Fabry-Perot interferometer unit can advantageously be omitted and a light attenuation on the photodetector device installed internally in the spectrometer device can advantageously be avoided.

The spectrometer device advantageously represents a measurement setup. The Fabry-Perot interferometer unit and the photodetector device are advantageously connected to one another in the spectrometer device or are arranged or formed in the spectrometer device so that the first connection region and the second connection region advantageously face in the same direction, for example against or in the light incidence direction, in other words facing toward or facing away from the light incidence direction. Due to the identical orientation of the two connection regions, the Fabry-Perot interferometer unit and the photodetector device can advantageously be electrically connected in the same electrical contacting step, for example each wire bonded to one wire bond connection. The number of the method steps during the electrical connection can thus advantageously be reduced, whereas in known components and their production methods, firstly wire bonding of the detector, then installing of the Fabry-Perot interferometer unit, and subsequently wire bonding of the Fabry-Perot interferometer unit take place, and usually additional components are also necessary for this purpose, for example spacers. In contrast, a cost reduction and a reduction of the work steps can advantageously be achieved using the structure according to the disclosure. A length of the wire connections, in particular of the connection wires, can advantageously be particularly short due to the advantageously small structural size of the spectrometer device.

It is furthermore possible that the spectrometer device comprises multiple Fabry-Perot interferometer units.

The spectrometer device according to the disclosure is advantageously implemented by a low number of components. Furthermore, during its production the number of the costly production steps can be minimized, for example a required alignment of the Fabry-Perot interferometer unit in relation to a detector installed on a printed circuit board can advantageously be omitted.

According to one preferred embodiment of the spectrometer device, the Fabry-Perot interferometer unit is encapsulated and formed as a MEMS component.

The Fabry-Perot interferometer unit is advantageously encapsulated at least from one side, wherein the encapsulation is advantageously achievable by enclosing the Fabry-Perot interferometer unit between the base substrate and/or the cap substrate. The Fabry-Perot interferometer unit is advantageously shielded here from the environment by the base substrate and the cap substrate. The MEMS component is advantageously a micromechanical component.

According to one preferred embodiment of the spectrometer device, the first electrical connection region and the second electrical connection region face toward or face away from the light incidence direction.

According to one preferred embodiment of the spectrometer device, it comprises a temperature sensor device, which is integrated in the second substrate and/or in the first substrate and/or the Fabry-Perot interferometer unit and is arranged outside the optical aperture.

The temperature sensor device can advantageously comprise any type of temperature-sensing element which can be integrated in a substrate or wafer or installed thereon, for example a pn-diode or a thermistor. The temperature sensor device can preferably be embodied combined with a first sensor of the photodetector device, which is integrated in the cap substrate. In this case, the temperature sensor device is arranged in a region outside the optical aperture, in which a metallic cover can also be arranged in or on the cap substrate or base substrate, which advantageously reduces or even prevents optical absorption of light in the region of the temperature sensor device, for example in the cap substrate or directly at the temperature sensor device, and thus a measurement modification of a temperature measurement due to the light incident in the spectrometer device. The metallic cover is advantageously arranged against the light incidence direction in or on the cap substrate starting from the temperature sensor device.

According to one preferred embodiment of the spectrometer device, the photodetector device comprises a first sensor which is integrated in the first substrate.

The photodetector device can advantageously also comprise discretely formed light detectors or sensors which are formed as an independent component and can be arranged on the cap substrate or on the base substrate, inside or outside the optical aperture. In this case, the discrete sensor can be bonded on the base substrate or cap substrate, whereby a light-absorbing or light-covering adhesive bond can advantageously be omitted. The yield of the light to be analyzed or to be detected and incident on the sensor can thus advantageously be increased, since adhesives, for example organic adhesives, can have their own absorption bands and can influence the incident light spectrum to be analyzed. In the region of the optical aperture, the first sensor can be arranged and a further discrete detector of the photodetector device can also be arranged, i.e., for example both on the optical axis of the Fabry-Perot interferometer unit or, in the case of a top view of the aperture in the first carrier substrate, within this aperture. However, it is also possible that at least the first sensor or the discrete detector is arranged outside the optical aperture. The first sensor can advantageously also extend beyond the aperture, seen in a top view thereof. The first sensor can include the first electrical connection region, to which it can be connected by a wire, for example, in an edge region of the cap substrate or base substrate.

According to one preferred embodiment of the spectrometer device, the photodetector device comprises a second sensor, which is arranged on or in the first substrate and/or second substrate outside the optical aperture, wherein the first substrate and/or second substrate comprises a metallic cover, which covers the second sensor against the light incidence direction, in a region of the second sensor.

The second sensor is advantageously arranged on the cap substrate and/or base substrate or integrated therein. The metallic cover and the second sensor, which advantageously comprises a light-sensing element, for example a diode, advantageously represent a reference detector for a dark current measurement here. In other words, the dark current at the location of the spectrometer device, which prevails without the incident light at the measurement time, can thus advantageously be ascertained and taken into consideration. The second sensor can preferably be embodied combined with a first sensor of the photodetector device, which can be integrated in the cap substrate or base substrate. The second sensor can be arranged as a discrete, independent sensor component at or on the cap substrate or base substrate or integrated therein.

According to one preferred embodiment of the spectrometer device, the reflector device comprises a paraboloid shape having a first focal point and the photodetector device is arranged at least in the first focal point, wherein the first focal point lies on an optical axis of the Fabry-Perot interferometer unit.

The reflector device can advantageously comprise one or more mirror elements or a lens. The optical axis of the Fabry-Perot interferometer unit advantageously extends through the aperture in the first carrier substrate perpendicular to a planar extension direction of the first carrier substrate and parallel to the light incidence direction or against it. The reflector device advantageously covers the half space over the Fabry-Perot interferometer unit, which follows the Fabry-Perot interferometer unit in the light incidence direction, and at least partially reflects the incident light back, after it has passed through the Fabry-Perot interferometer unit and the cap substrate and through the base substrate (other sequences also possible), advantageously onto the substrate which the light passed through last (cap substrate or base substrate), in particular onto the photodetector device arranged thereon or therein, and advantageously focuses the light in the first focal point. The signal intensity of the light to be detected is thus advantageously increased, since the light which was not completely absorbed during the first passage through the photodetector device, which is located on the optical axis in the optical aperture, or passed by it can advantageously be reflected back advantageously by means of the reflector device, which can be formed as a reflective optical element, onto the photodetector device.

For referencing of the measurement of the light, the photodetector device can advantageously comprise additional components, such as light detectors, which are advantageously arranged outside the optical aperture and thus advantageously outside the first focal point and can be covered by a metallic cover against the incident light. The metallic cover can comprise, for example, any type of essentially planar metallization on or in the substrates or a metallic layer.

The imaging of the incident light via a hollow mirror, advantageously in its focal point, advantageously guarantees a restriction of the acceptance angle of the Fabry-Perot interferometer unit corresponding to the detector area and the focal length of the mirror. Due to focusing of the light in the focal point, a smaller light detector of the photodetector device can advantageously be used, which advantageously saves further costs.

According to one preferred embodiment of the spectrometer device, the reflector device comprises an at least partially ellipsoidal shape having a first focal point and a second focal point and the photodetector device is arranged in the second focal point, wherein the second focal point lies outside an optical axis of the Fabry-Perot interferometer unit.

The photodetector device can advantageously comprise a sensor region inside the optical aperture in the first focal point and a further sensor region outside the optical aperture in a second focal point. These sensor regions can comprise light detectors which are each arranged on or in the substrate (base substrate and/or cap substrate). The reflector device advantageously has an ellipsoidal shape, which comprises two focal points, wherein the light can be collected in the first focal point and can be focused concentrated on the second focal point. The photodetector device in the second focal point can advantageously be adhesively bonded on the base substrate or cap substrate, since the light is advantageously deflected at the point of the second focal point by mirrors from the direction opposite to the light incidence direction onto the photodetector device and does not have to be transmitted through the substrate and possibly the adhesive.

According to one preferred embodiment of the spectrometer device, it comprises a second carrier substrate, on which the second substrate is arranged and is at least partially fixed by means of an adhesive bond.

The second carrier substrate can comprise a printed circuit board, for example.

The second carrier substrate advantageously comprises an electronic carrier substrate, such as a printed circuit board, on which the advantageously miniaturized spectrometer device can be arranged and fixed.

According to one preferred embodiment of the spectrometer device, the second substrate comprises a first region on a lower side and can be installed at this region using an adhesive bond on the second carrier substrate.

According to one preferred embodiment of the spectrometer device, the second substrate comprises a second region on a lower side and can be installed using this region via an installation stop on the second carrier substrate.

The adhesive bond is advantageously limited to the first region, so that the installation stop can be free of an adhesive bond. The installation stop can comprise a base, for example as a spacer and/or base point for the base substrate on the second carrier substrate. A screen can advantageously also be arranged in the second region, which is advantageously not transmissive to the incident light. The screen can extend over the entire lower side of the base substrate facing toward the second carrier substrate or can only extend partially over it, advantageously can be arranged or attached thereon, and can comprise an opening for light transmission, which can correspond in lateral extension to the optical aperture in the first carrier substrate. The first region can also comprise the screen, which can be connected there to the second carrier substrate using the adhesive bond. The first region is advantageously located in that region of the base substrate on which the second electrical connection region, such as its wire bond paths, of the Fabry-Perot interferometer unit can be provided, whereby an improved quality of a wire bond contact can be achieved.

According to one preferred embodiment of the spectrometer device, the reflector device comprises a hollow mirror.

A structural size of the spectrometer device can advantageously be reduced in relation to an embodiment having a lens by the use of a mirror.

According to one preferred embodiment of the spectrometer device, the photodetector device is arranged using a bond connection on the second substrate or on the first substrate.

Alternatively thereto, it is also possible that the photodetector device is arranged using an adhesive bond on the base substrate or on the cap substrate.

According to the disclosure, in the method for producing a spectrometer device, a first substrate and/or a second substrate and a Fabry-Perot interferometer unit having a first carrier substrate are provided, wherein the first carrier substrate is arranged on a lower side of the Fabry-Perot interferometer unit and has an optical aperture; the Fabry-Perot interferometer unit is arranged having the first carrier substrate on the second substrate, wherein the first carrier substrate is arranged having the lower side on the second substrate and/or the first substrate is arranged on the Fabry-Perot interferometer unit, wherein the first substrate is arranged on an upper side of the Fabry-Perot interferometer unit, which faces away from the lower side, and wherein a photodetector device is arranged on or in the second substrate and/or on or in the first substrate or is integrated therein; and a first electrical connection region of the photodetector device and a second electrical connection region of the Fabry-Perot interferometer unit are electrically contacted using wire connections, wherein the contacting takes place from the same side.

According to one preferred embodiment of the method, after method step S3, in a method step S4, the second substrate is arranged on a second carrier substrate and the base substrate is at least partially adhesively bonded to the second carrier substrate.

In a further method step S5, a reflector device is arranged over the second substrate or over the first substrate in such a way that the reflector device is arranged downstream of the photodetector device in a light incidence direction, so that the photodetector device is arranged between the reflector device and the Fabry-Perot interferometer unit.

The method is advantageously also distinguished by the features described in conjunction with the spectrometer device and the advantages thereof and vice versa.

Further features and advantages of embodiments of the disclosure result from the following description with reference to the appended drawings.

BRIEF DESCRIPTION OF THE DRAWINGS

The present disclosure is explained in greater detail hereinafter on the basis of the exemplary embodiments indicated in the schematic figures of the drawings.

In the figures.

In the figures, identical reference signs identify identical or functionally-identical elements.

DETAILED DESCRIPTION

Figure 1:
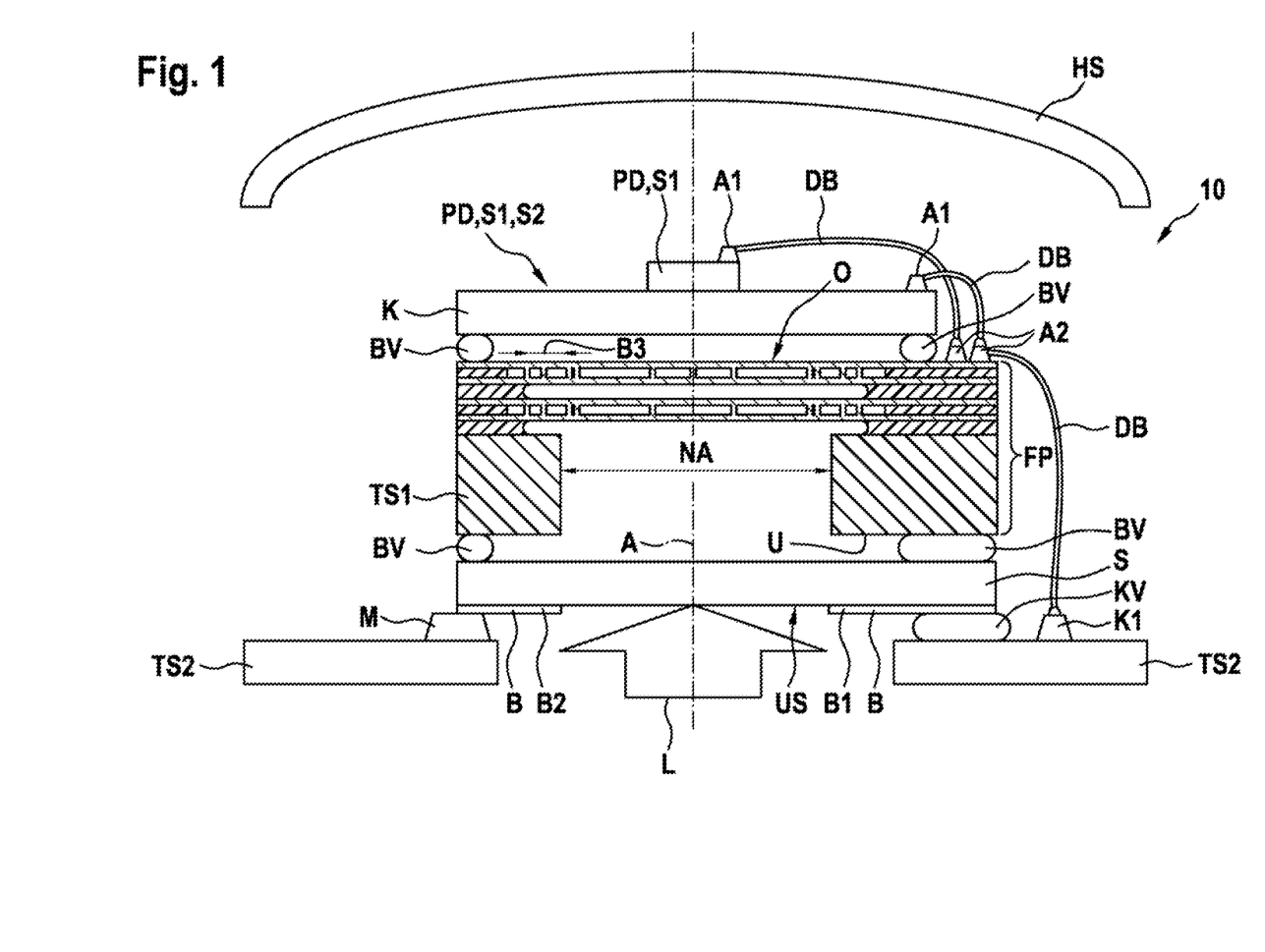
FIG. 1 shows a schematic cross section through a spectrometer device according to one exemplary embodiment of the present disclosure.

FIG. 1 shows a schematic cross section through a spectrometer device according to one exemplary embodiment of the present disclosure.

The spectrometer device 10 comprises a first substrate K, advantageously a cap substrate K and/or a second substrate S, advantageously a base substrate S; a Fabry-Perot interferometer unit FP, which comprises a first carrier substrate TS1, wherein the first carrier substrate TS1 includes a lower side U and advantageously an opening having an optical aperture NA and wherein the first carrier substrate TS1 can be arranged having the lower side U on the base substrate S, wherein the cap substrate K can be arranged on an upper side O of the Fabry-Perot interferometer unit FP. Furthermore, the spectrometer device 10 comprises a photodetector device PD, which can be arranged on or in the base substrate S and/or on or in the cap substrate K, and can comprise multiple components as light detectors, wherein a first electrical connection region A1 of the photodetector device PD and a second electrical connection region A2 of the Fabry-Perot interferometer unit FP can be electrically contacted from the same direction. Furthermore, the spectrometer device 10 advantageously comprises a reflector device HS, which is arranged downstream of the photodetector device PD in a light incidence direction L, so that the photodetector device PD is arranged between the reflector device HS and the Fabry-Perot interferometer unit FP. A defined pressure can advantageously be set in the cavity between the two substrates by the cap substrate K and the base substrate S.

The photodetector device PD can comprise a first sensor S1, which can be integrated in the cap substrate, advantageously on one of the sides of the cap substrate K facing away from the light incidence direction L. Furthermore, the photodetector device PD can comprise a second sensor S2, which can be arranged inside and/or outside the opening NA and can be shielded from the incident light by a metallic cover (not shown) against the light incidence direction L for the dark current measurement. However, the second sensor can alternatively thereto also be arranged outside a metallic cover and can measure the direct light incidence or its reflection on the reflector device. The first sensor S1 can advantageously also be formed as a discrete light detector and can be located on the optical axis A through the opening NA having the optical aperture. The sensor S1 can optionally (alternatively to the illustration) also be connected upside down (flip chip) to a metallization applied to the cap substrate, which leads via conductor tracks to a first connection region A1. The first sensor S1 can also be located on the optical axis A or around it as the sensor integrated in the cap substrate K. The cap substrate K is advantageously arranged via a bond connection BV, which can comprise a bond frame, on the Fabry-Perot interferometer unit FP on its upper side O. The mirror elements of the Fabry-Perot interferometer unit FP can have an underetching toward the first carrier substrate TS1 in a region B3, which can extend laterally beyond the opening NA, whereby mechanical decoupling of the tension of an inner region of the mirror elements of the Fabry-Perot interferometer unit FP via the opening NA and the first carrier substrate TS1 can be achievable, whereby improved plane-parallelism of the mirror elements in the inner region can advantageously be achievable. The Fabry-Perot interferometer unit FP can furthermore advantageously be arranged via a further bond connection, advantageously a further bond frame, having its lower side U on the base substrate S, wherein the base substrate can comprise a screen B on its lower side US facing away from the Fabry-Perot interferometer unit FP. The screen B can comprise an opening, which can correspond to the opening NA in the first carrier substrate TS1 and can cover the Fabry-Perot interferometer unit FP against the incident light except for the optical aperture NA. In the first region B1 on the lower side US of the base substrate S, which can correspond to the screen B in this region, an adhesive bond KV to a second carrier substrate TS2 can advantageously be produced, and the base substrate S can be fixed on the second carrier substrate TS2. The second carrier substrate TS2 can advantageously comprise a printed circuit board and advantageously includes an opening, which is suitable for transmitting the incident light through into the opening NA, for example can be formed laterally larger than the opening NA. In a second region B2 on the lower side US of the base substrate S, the base substrate S can be arranged or installed via an installation stop M on the second carrier substrate TS2.

In the arrangement of the photodetector device PD on or in the cap substrate K, adhesive bonding can advantageously be omitted, whereby advantageously no attenuation or modification of the incident light results on the path to the photodetector device PD in the spectrometer device 10. For example, the photodetector device PD can be bonded directly on the cap substrate K.

The first electrical connection region A1 of the photodetector device PD is advantageously provided on each element of the photodetector device PD, for example on the first sensor S1 and on the second sensor S2 and also on possible further detectors. From these connection regions A1, a wired connection DB can be led to further first connection regions A1 or second connection regions A2 of the Fabry-Perot interferometer unit FP or contact points K1 on the second carrier substrate TS2. Advantageously, all contact points K1 and also first connection regions A1 and second connection regions A2 are aligned in the same direction with respect to the light incidence direction L, for example also arranged on the same lateral side of the cap substrate K and/or of the base substrate S and/or of the Fabry-Perot interferometer unit FP, and can advantageously be electrically contacted using a wire bond method in the same method step and from the same side, which can save costs in the connecting, connection means, and method steps.

The reflector device HS advantageously comprises one or more paraboloid hollow mirrors, wherein other reflective elements are also conceivable, which can reflect the light, which was not completely absorbed by the photodetector device PD during a first passage, back onto the photodetector device. The reflector device HS advantageously overlaps the half space over the cap substrate K and can lie on the optical axis, wherein the focal point of the reflector device HS can lie on the optical axis A.

The reflector device HS can also comprise an optimized free form.

The spectrometer device 10 is advantageously distinguished by the smallest possible number of components and can be produced using the fewest possible costly method steps and can advantageously be used in micro-spectrometers.

Figure 2:
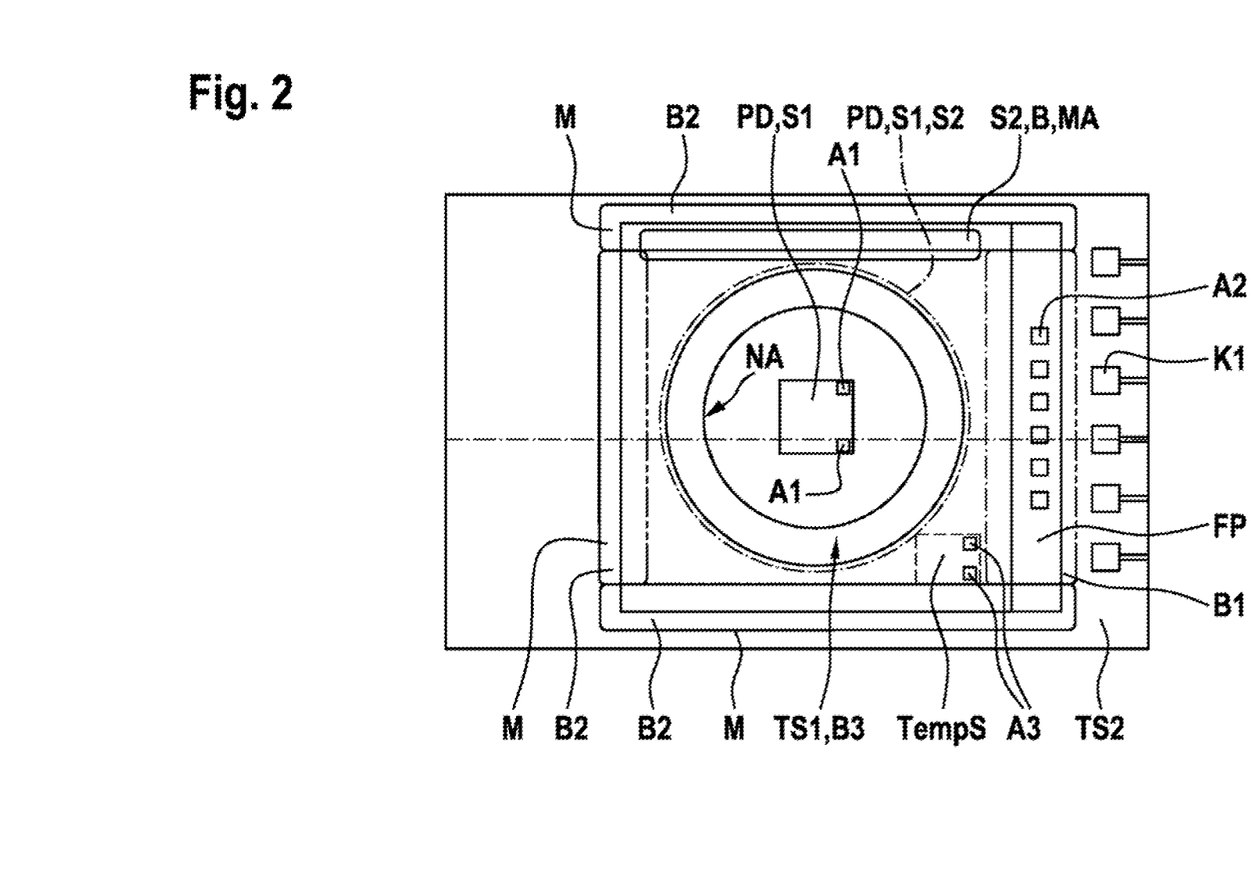
FIG. 2 shows a schematic top view of a spectrometer device from FIG. 1.

FIG. 2 shows a schematic top view of a spectrometer device from FIG. 1.

The arrangement made up of base substrate, Fabry-Perot interferometer unit, and cap substrate can advantageously be arranged on the second carrier substrate TS2, wherein the second carrier substrate TS can extend laterally beyond the cap substrate and base substrate and the Fabry-Perot interferometer unit in all directions. The opening having the optical aperture NA is advantageously formed in a circle in the first carrier substrate TS1, wherein the region B3 of the underetching can extend in a circle between the mirror elements and the first carrier substrate TS1 of the Fabry-Perot interferometer unit laterally beyond the opening NA. The contact points K1 can be formed in a plurality on the second carrier substrate TS2. The Fabry-Perot interferometer unit FP can extend over the first region B1 laterally beyond the cap substrate K, so that the contact points of the second electrical connection region A2 are exposed in a top view. In a region outside the opening NA, a temperature sensor device TempS is advantageously arranged in the cap substrate K or the Fabry-Perot interferometer unit, which can itself comprise a third connection region A3 for contacting, for example with wire bonds. The second region B2 having the installation stop M can advantageously be formed on all edge regions of the base substrate, except in the first region B1, which can extend over an entire side of the base substrate. The second sensor S2 can be formed having the metallic cover MA (B) in an edge region of the cap substrate or of the base substrate (for example also underneath on the installation stop). The contact points of the first connection region A1, of the second connection region A2, and of the third connection region A3 can advantageously be formed toward the same lateral edge of the spectrometer device, preferably for the shortest possible wire bond connection toward the contact points K1 on the second carrier substrate TS2.

Figure 3:
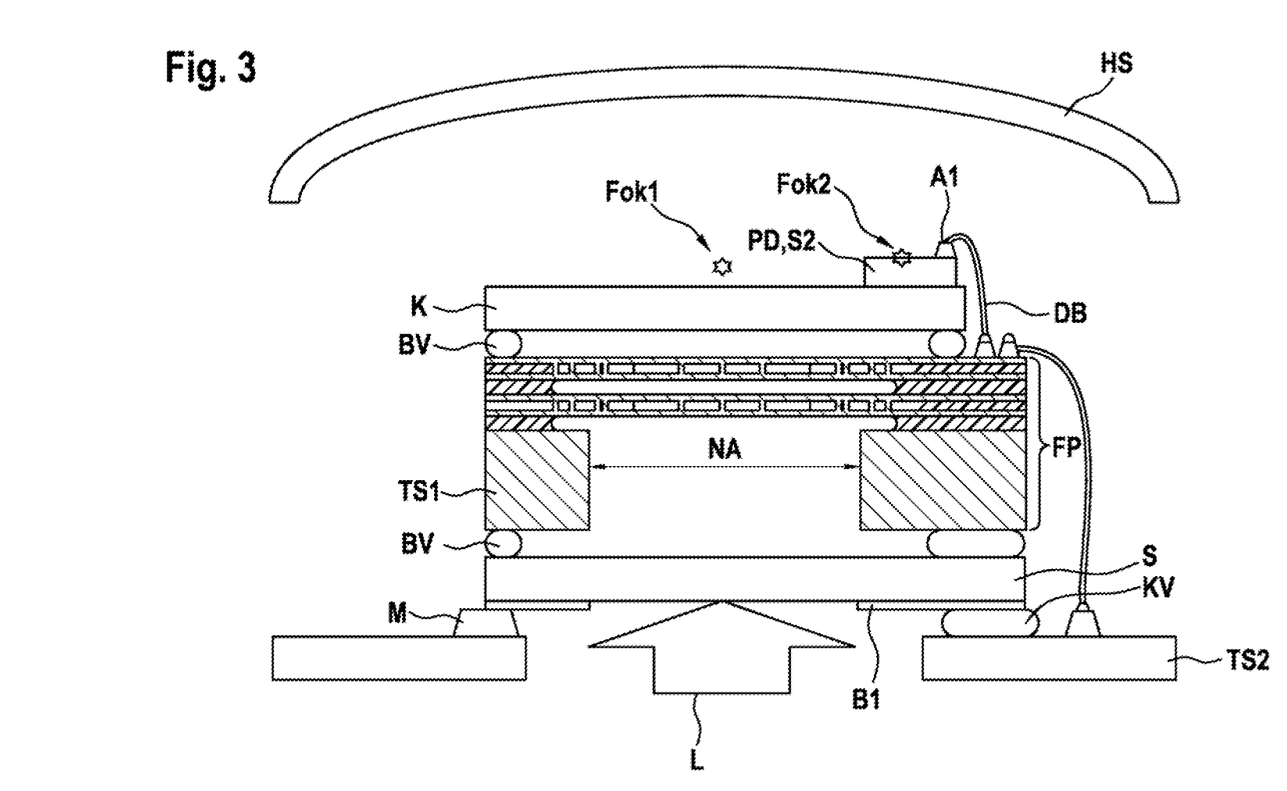
FIG. 3 shows a schematic cross section through a spectrometer device according to a further exemplary embodiment of the present disclosure.

FIG. 3 shows a schematic cross section through a spectrometer device according to a further exemplary embodiment of the present disclosure.

The embodiment of the spectrometer device from FIG. 3 essentially corresponds to that from FIG. 1, with the difference that the reflector device HS comprises an ellipsoidal hollow mirror having a first focal point Fok1 and a second focal point Fok2 and the photodetector device PD can be arranged at least in the second focal point Fok2, wherein the first focal point Fok1 advantageously lies on the optical axis A and the second focal point Fok2 advantageously lies outside the optical axis A. In this case, the photodetector device PD can be arranged in the region of the second focal point Fok2 using an adhesive bond on the cap substrate K, since the incident light collected in the first focal point and then reflected by the hollow mirror onto the photodetector device is focused in the second focal point Fok2. The photodetector device PD can comprise a discrete detector here, for example also the second sensor S2, in the second focal point, which can be formed as a simple detector for measuring the incident light.

The photodetector device PD in the second focal point Fok2 can be arranged at least partially over the first region B1 and/or over the second region B2.

Alternatively, the hollow mirror HS can also be tilted in such a way that its second focal point Fok2 coincides with the position of the photodetector device PD, which lies outside the optical axis A. The hollow mirror can also comprise an optimized free form.

Figure 4:
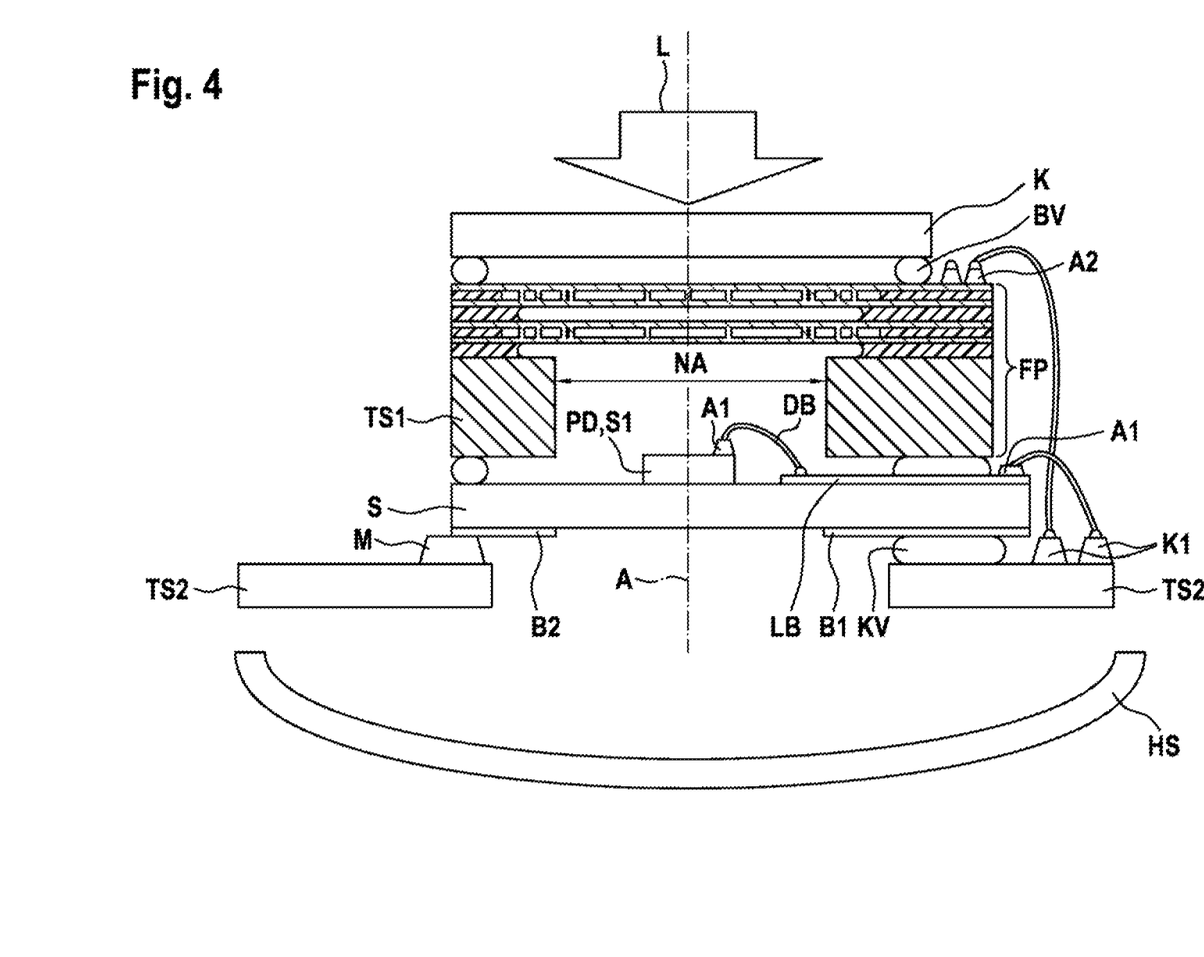
FIG. 4 shows a schematic cross section through a spectrometer device according to a further exemplary embodiment of the present disclosure.

FIG. 4 shows a schematic cross section through a spectrometer device according to a further exemplary embodiment of the present disclosure.

The embodiment of the spectrometer device from FIG. 4 essentially corresponds to that from FIG. 1, with the difference that the light incidence direction L now advantageously extends in such a way that the incident light first enters through the cap substrate K into the spectrometer device 10, and that the reflector device HS is arranged downstream of the base substrate S and the second carrier substrate TS2, advantageously in this sequence. In this case, the first connection region A1, the second connection region A2, and the contact points K1 on the second carrier substrate TS2 advantageously face toward the light incidence direction L, wherein they can face away from the light incidence direction in the exemplary embodiment of FIG. 1. The photodetector device PD is arranged with at least one component, for example the first sensor S1, which can be formed as a discrete component, on the base substrate S or integrated therein, advantageously on the optical axis. For this purpose, the base substrate can comprise a conductor track on a surface facing toward the Fabry-Perot interferometer unit FP for wire contacting with the first connection region A1 of the photodetector device PD. The photodetector device PD can be formed, bonded, or adhesively bonded on the base substrate S, for example also via flip chip methods on conductor tracks of the base substrate S. The first connection region A1 can be offset at the edge of the base substrate S by the electrical conductor track LB.

In all exemplary embodiments, instead of the opening, only an optical aperture can also be provided.

Figure 5:
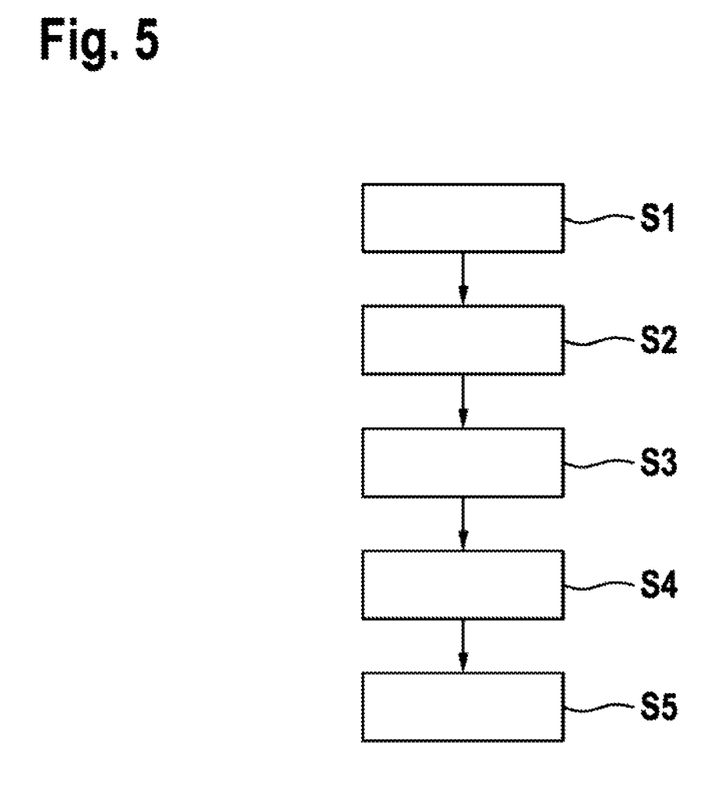
FIG. 5 shows a schematic sequence of steps of the method according to one exemplary embodiment of the present disclosure.

FIG. 5 shows a schematic sequence of the steps of the method according to one exemplary embodiment of the present disclosure.

In the method for producing a spectrometer device, a first substrate and/or a second substrate and a Fabry-Perot interferometer unit having a first carrier substrate are provided S1, wherein the first carrier substrate is arranged on a lower side of the Fabry-Perot interferometer unit and includes an optical aperture; the Fabry-Perot interferometer unit is arranged S2 with the first carrier substrate on the second substrate, wherein the first carrier substrate is arranged having the lower side on the second substrate and/or the first substrate is arranged on the Fabry-Perot interferometer unit, wherein the first substrate is arranged on an upper side of the Fabry-Perot interferometer unit, which faces away from the lower side, and wherein a photodetector device is arranged on or in the second substrate and/or on or in the first substrate or is integrated therein; and electrically contacting S3 a first electrical connection region of the photodetector device and a second electrical connection region of the Fabry-Perot interferometer unit using wire connections, wherein the contacting takes place from the same side.

After method step S3, in a further method step S4, the base substrate or the Fabry-Perot interferometer unit can be arranged on a second carrier substrate and the base substrate or the Fabry-Perot interferometer unit can be at least partially adhesively bonded to the second carrier substrate. In a further, advantageously subsequent method step S5, a reflector device is arranged over the base substrate or over the cap substrate in such a way that the reflector device is arranged downstream of the photodetector device in a light incidence direction, so that the photodetector device is arranged between the reflector device and the Fabry-Perot interferometer unit.

Although the present disclosure was described completely above on the basis of the preferred exemplary embodiments, it is not restricted thereto, but rather can be modified in a variety of ways.

The invention claimed is:

1. A spectrometer device comprising:
   a Fabry-Perot interferometer unit, which comprises a first carrier substrate, wherein the first carrier substrate is located at a lower portion of the Fabry-Perot interferometer unit and includes an optical aperture through which light enters the Fabry-Perot interferometer unit;
   a first substrate, which is arranged on an upper side of the Fabry-Perot interferometer unit and which covers the Fabry-Perot interferometer unit;
   a second substrate, wherein the first carrier substrate is attached to the second substrate; and
   a photodetector device arranged on or in the first substrate, wherein a first electrical connection region of the photodetector device and a second electrical connection region of the Fabry-Perot interferometer unit are electrically contacted from the same direction.

2. The spectrometer device as claimed in claim 1, wherein:
   the first substrate comprises a cap substrate covering the Fabry-Perot interferometer unit; and
   the second substrate comprises a base substrate, on which the Fabry-Perot interferometer unit is attached.

3. The spectrometer device as claimed in claim 1, wherein the optical aperture is formed by at least one of an opening in the first carrier substrate, and a nontransparent coating on the first carrier substrate.

4. The spectrometer device as claimed in claim 1, wherein a reflector device is arranged downstream of the photodetector device in a light incidence direction, so that the photodetector device is arranged between the reflector device and the Fabry-Perot interferometer unit.

5. The spectrometer device as claimed in claim 4, wherein:
   the reflector device comprises a paraboloid shape having a first focal point and the photodetector device is arranged at least in the first focal point; and
   the first focal point lies on an optical axis of the Fabry-Perot interferometer unit.

6. The spectrometer device as claimed in claim 4, wherein:
   the reflector device comprises an at least partially ellipsoidal shape having a first focal point and a second focal point;
   the photodetector device is arranged in the second focal point; and
   the second focal point lies outside an optical axis of the Fabry-Perot interferometer unit.

7. The spectrometer device as claimed in claim 4, wherein the reflector device comprises a hollow mirror.

8. The spectrometer device as claimed in claim 1, in which the first electrical connection region and the second electrical connection region both face toward or both face away from the light incidence direction.

9. The spectrometer device as claimed in claim 1, further comprising:
   a temperature sensor device integrated in at least one of the second substrate, the first substrate, and the Fabry-Perot interferometer unit.

10. The spectrometer device as claimed in claim 9, wherein the temperature sensor device is arranged outside the optical aperture.

11. The spectrometer device as claimed in claim 1, in which the photodetector device comprises a first sensor, which is integrated in the first substrate.

12. The spectrometer device as claimed in claim 1, further comprising:
    a second sensor, which is at least one of arranged on or in the first substrate, and arranged on the second substrate outside the optical aperture, wherein the first substrate and/or the second substrate in or upon which the second sensor is arranged comprises a metallic cover, in a region of the second sensor, which covers the second sensor against a light incidence direction.

13. The spectrometer device as claimed in claim 1, wherein:
    the spectrometer device comprises a second carrier substrate; and
    the second substrate is arranged on the second carrier substrate and is at least partially fixed by means of an adhesive bond.

14. The spectrometer device as claimed in claim 13, wherein the adhesive bond is formed using a first region on a lower side of the second substrate.

15. The spectrometer device as claimed in claim 13, wherein;
    the second substrate comprises a second region on a lower side; and
    the second substrate is installed on the second carrier substrate using the second region and an installation stop.

16. The spectrometer device as claimed in claim 1, wherein the photodetector device is arranged on or in the first substrate using a bond connection.

17. The spectrometer device as claimed in claim 1, wherein the second substrate is located beneath the first carrier substrate.

18. A method for producing a spectrometer device comprising:
    providing a Fabry-Perot interferometer unit having a first carrier substrate, wherein the first carrier substrate is located at a lower portion of the Fabry-Perot interferometer unit and includes an optical aperture through which light enters the Fabry-Perot interferometer unit;
    providing a first substrate on the Fabry-Perot interferometer unit with the first substrate arranged on an upper side of the Fabry-Perot interferometer unit;
    attaching a second substrate to the first carrier substrate;
    arranging or integrating a photodetector device on or in the first substrate; and
    electrically contacting a first electrical connection region of the photodetector device and a second electrical connection region of the Fabry-Perot interferometer unit using wire connections, wherein the electrical contacting takes place from a single direction.

19. The method as claimed in claim 18, further comprising, after electrically contacting the first electrical connection region and the second electrical connection region:
- arranging the second substrate on a second carrier substrate of the Fabry-Perot interferometer unit; and
- at least partially adhesively bonding the second substrate to the second carrier substrate.

20. The method as claimed in claim 18, further comprising, after electrically contacting the first electrical connection region and the second electrical connection region:
- arranging a reflector device over the second substrate such that the reflector device is arranged downstream of the photodetector device in a light incidence direction, and the photodetector device is arranged between the reflector device and the Fabry-Perot interferometer unit.

* * * * *